(No Model.)
J. W. HILL.
STOP AND WASTE VALVE.
No. 502,563.
2 Sheets—Sheet 1.
Patented Aug. 1, 1893.
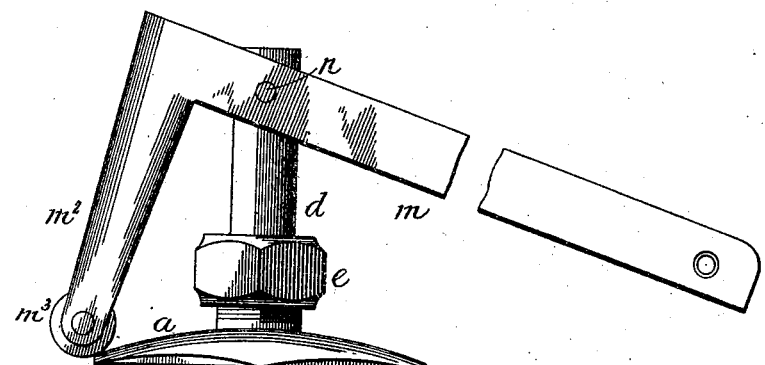
Fig. 1.
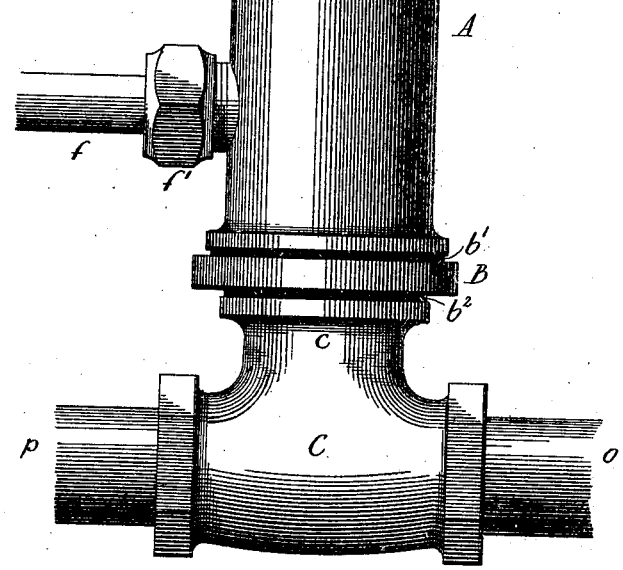
Fig. 3.
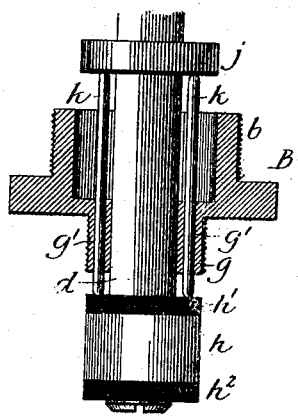
Witnesses
Inventor
Job W. Hill
By W. W. Dudley & Co.
his Attorneys (No Model.) 2 Sheets—Sheet 2.
J. W. HILL.
STOP AND WASTE VALVE.
No. 502,563. Patented Aug. 1, 1893.
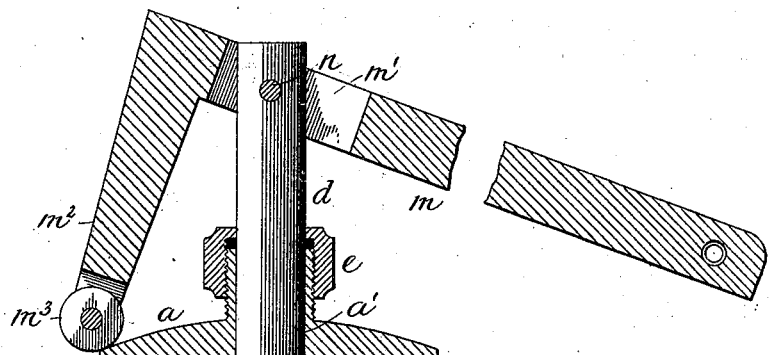
Fig. 2.
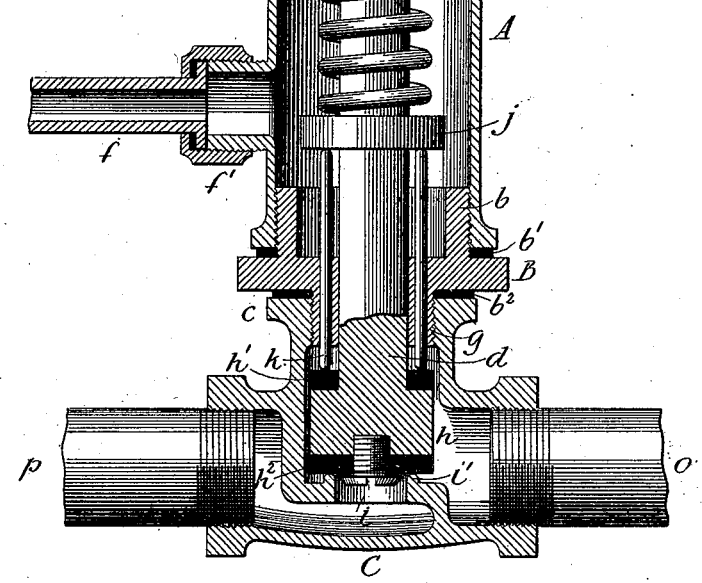
Fig. 4.
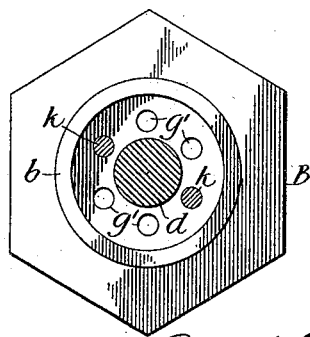
Witnesses
Will T. Norton
Geo. H. Brown Jr.
Inventor
Job W. Hill
By A. W. Dudley & Co
his Attorneys

UNITED STATES PATENT OFFICE.

JOB W. HILL, OF MANCHESTER, NEW HAMPSHIRE.

STOP AND WASTE VALVE.

SPECIFICATION forming part of Letters Patent No. 502,563, dated August 1, 1893.

Application filed December 1, 1892. Serial No. 453,766. (No model.)

*To all whom it may concern:*

Be it known that I, JOB W. HILL, a citizen of the United States, residing at Manchester, in the county of Hillsborough and State of New Hampshire, have invented certain new and useful Improvements in Stop and Waste Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in stop and waste valves designed especially for use in connection with water supply pipes, and has for its object to produce a valve of new and novel construction and operation which will operate to prevent the freezing of water in the service pipes, and which will overcome the disadvantages due to the use of such devices heretofore employed.

My invention consists generally in a valve which is double-acting in character, and which operates normally by the action of a spring to close the main or supply pipe, and to open the passage to the waste pipe whereby the water contained in the service pipe may be drawn off; and in a lever handle which when raised against the action of the spring will operate the valve to open the passage between the supply and service pipe, and close the passage to the waste pipe; and in certain details of construction and operation, all of which will hereinafter fully and clearly appear from a reading of the following description.

Reference being had to the accompanying drawings which form a part of this specification, Figure 1, illustrates my improved valve in elevation; Fig. 2, a vertical central section of the same. Fig. 3, is a detail in section of the valve, stem, and nut; and Fig. 4 is a plan view of the nut detached.

Like letters of reference denote like parts in the several figures of the drawings.

The reference letter A denotes the barrel to which is secured by means of the nut B, the coupling C which latter connects the main or supply pipe with the service pipe. The barrel is provided at its upper end with a hexagonal flange $a$ the surface of which is slightly convex for a purpose presently to be described. In the top of the barrel is an opening $a'$ for the valve stem $d$, and $e$ is a stuffing box above the flange $a$ to prevent leakage when the valve is lowered.

$f$ is the waste pipe which is secured to the side of the barrel by a stuffing box $f'$ as shown. The lower end of the barrel is internally screw-threaded to receive the upper screw-threaded flange $b$ of the nut B, a washer $b'$ being interposed between the hexagonal flange of the nut, and the bottom of the barrel to insure a water-tight joint.

$g$ is a flange extending downward from the nut and which is screw-threaded to receive the branch $c$ of the coupling C, and $b^2$ is a washer between the nut and branch $c$.

$g'$ $g'$ represent a series of perforations which extend through the flange $g$ of the nut B to constitute passages for the water from the service pipe.

$h$ is the valve which is secured to the lower end of the stem $d$ and which is double-acting in character. The valve is cylindrical in shape and is provided with gaskets, the upper one of which $h'$ is adapted when the valve is raised, to close the perforations $g'$ in the nut and the passage to the waste pipe; and the other gasket $h^2$ operates when the valve is lowered to close the opening $i$ in the coupling, a seat $i'$ being formed to receive the gasket, as shown.

$j$ is a collar on the valve-stem, and $k\ k$ are pins which are passed through two of the perforations $g'$, and extend from the said collar to the gasket $h'$ to prevent the latter from being displaced by the action of the waste water flowing from the service pipe.

$l$ is a coiled spring surrounding the valve stem between the collar $j$ and the top of the barrel and which operates to normally close the opening $i$ in the coupling, and to open the passage to the waste pipe. The valve is raised by the action of a lever handle $m$, which is provided with a slot $m'$ to receive the top of the stem, a pin $n$ being employed to pivotally connect them together at this point.

$m^2$ is a lug arranged on the end of the lever, provided with a friction roller $m^3$ which is in contact with the upper surface of the flange $a$ and which serves as a fulcrum for the lever. The other end of the lever constitutes a handle, and may be operated directly or through the agency of a chain. Any suitable device for locking the handle in its raised position may be employed, it being understood that the valve must be raised in order to permit the water to flow through the service pipe.

In operation, the parts being in the position shown in the drawings, the water is prevented by the action of the valve, from passing from the supply pipe $o$ into the service pipe $p$, and there being an uninterrupted passage between the latter pipe and the waste pipe the water above ground is permitted to flow through the waste pipe, and hence all liability of freezing is overcome. By raising the valve the passage between the supply and service pipes is opened, and the passage to the waste pipe closed by the action of the gasket $h'$ which as before stated is held against displacement by the pins $k$.

The valve is simple in construction and operation, and by reason of its few parts the liability to get out of order or become broken is reduced to the minimum.

What I claim as new, and desire to secure by Letters Patent, is—

1. In a stop and waste valve, the combination of a barrel, passages leading to said barrel, a valve having a gasket for closing said passages, a valve stem having a collar thereon and pins between said collar and gasket to prevent the displacement of the latter substantially as described.

2. In a stop and waste valve, the combination of a barrel having a waste outlet, a coupling for connecting the supply and service pipes and having a passage therein, a nut connecting the barrel and coupling and having a series of perforations therein, a double-acting valve provided with gaskets for alternately closing the perforations and the passages in the coupling, a valve stem having a collar thereon, pins operating with said collar to prevent the displacement of the upper gasket, a spring between the collar and the top of the barrel, and means substantially as described for raising said valve and stem against the action of the spring, substantially as described.

3. In a stop and waste valve, the combination of a barrel having a waste outlet, a flange having a convex surface, and a stuffing box arranged above the same, a coupling connecting the supply and service pipes, having a passage therein, a nut connecting the barrel and coupling, and having a series of perforations therein, a valve having gaskets for closing alternately the perforations and the passage in the couplings, a valve stem, a collar on said stem, pins $k$ for preventing the displacement of the upper gasket, spring $l$, the lever having pivotal connection with the upper end of the valve stem, the lug on the end of the lever, and the friction roller for engagement with the upper surface of the flange, substantially as set forth.

In testimony whereof I affix my signature in presence of two witnesses.

JOB W. HILL.

Witnesses:
GEO. W. PRESCOTT,
GEORGE B. N. DOW.